Jan. 13, 1959 K. K. KNOPF 2,867,980
PRIME MOVER OF THE GAS TURBINE TYPE
Filed Sept. 1, 1953 4 Sheets-Sheet 1
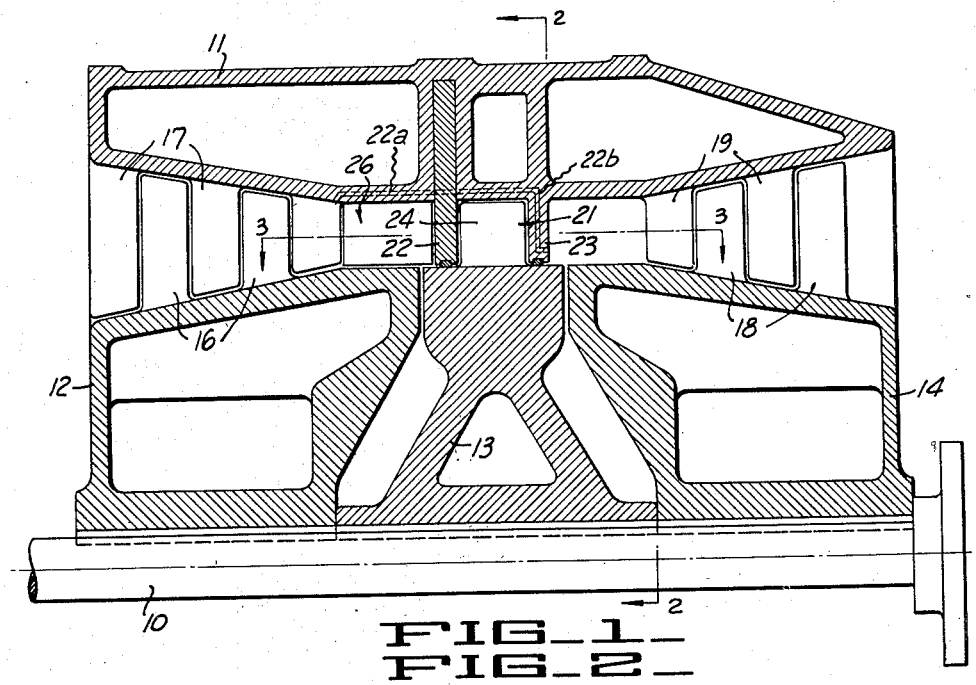
FIG_1_
FIG_2_
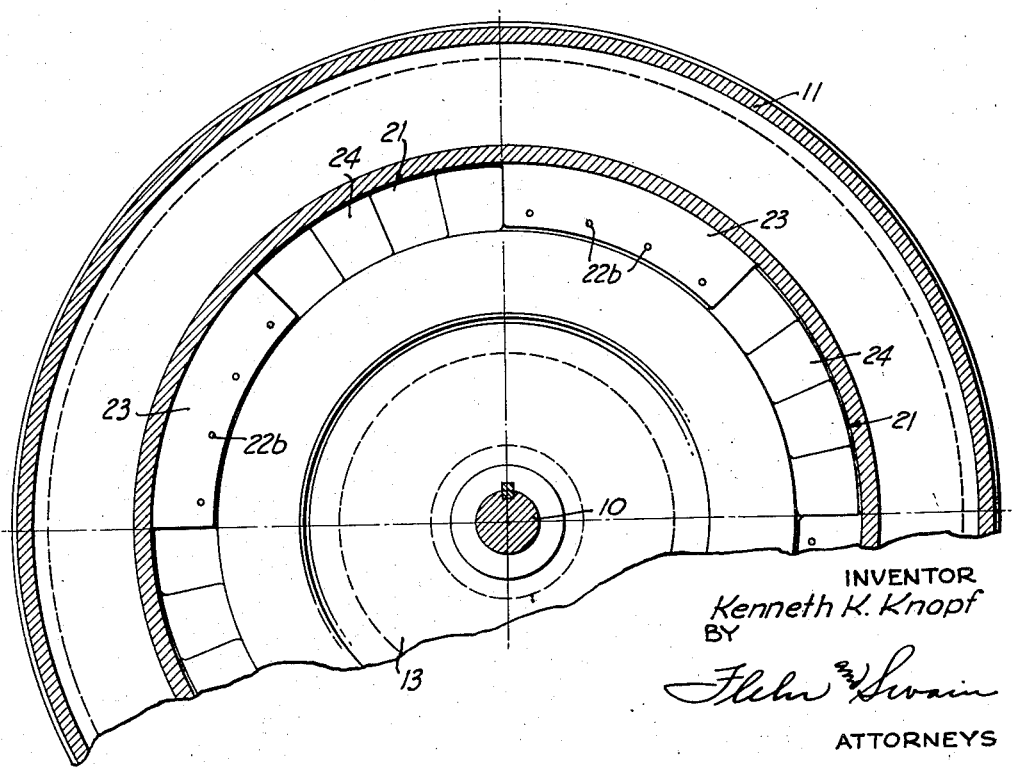
INVENTOR
Kenneth K. Knopf
BY
ATTORNEYS Jan. 13, 1959     K. K. KNOPF     2,867,980
PRIME MOVER OF THE GAS TURBINE TYPE
Filed Sept. 1, 1953     4 Sheets-Sheet 2

INVENTOR
Kenneth K. Knopf
BY
ATTORNEYS

Jan. 13, 1959            K. K. KNOPF           2,867,980
PRIME MOVER OF THE GAS TURBINE TYPE
Filed Sept. 1, 1953                         4 Sheets-Sheet 3
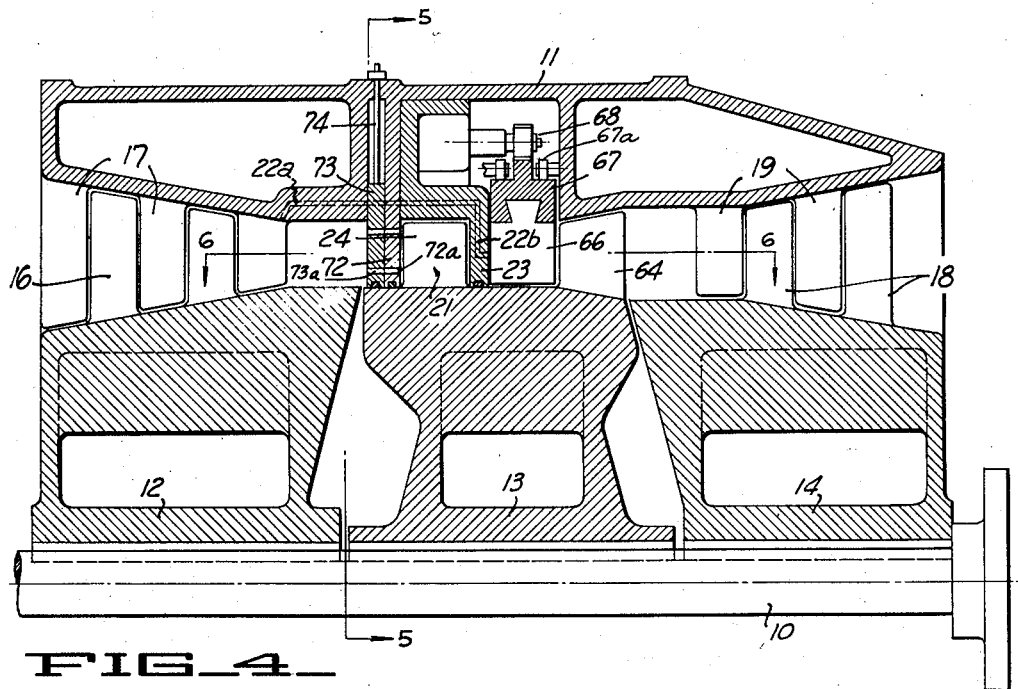
FIG_4_
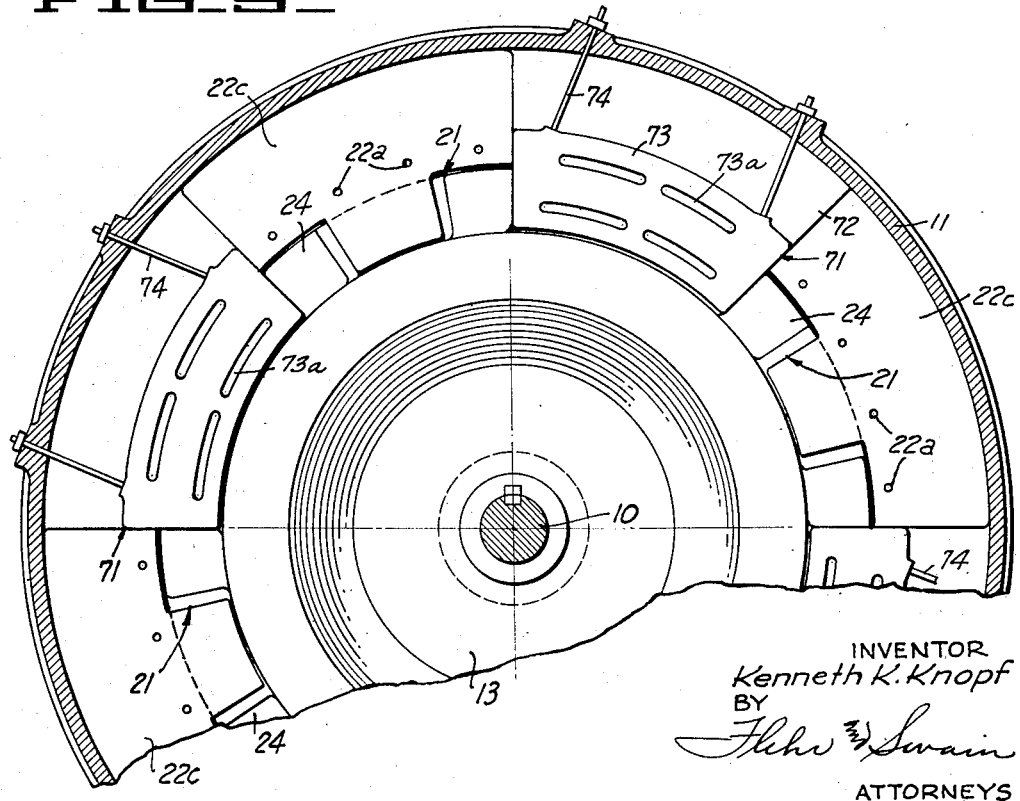
FIG_5_
INVENTOR
Kenneth K. Knopf
BY
ATTORNEYS Jan. 13, 1959 K. K. KNOPF 2,867,980
PRIME MOVER OF THE GAS TURBINE TYPE
Filed Sept. 1, 1953 4 Sheets-Sheet 4

INVENTOR.
Kenneth K. Knopf
BY
ATTORNEYS

United States Patent Office 2,867,980
Patented Jan. 13, 1959

2,867,980
PRIME MOVER OF THE GAS TURBINE TYPE

Kenneth K. Knopf, San Mateo, Calif.

Application September 1, 1953, Serial No. 377,840

3 Claims. (Cl. 60—39.37)

This invention relates generally to prime movers of the gas turbine type such as are suitable for use on aircraft or other applications where it is desired to generate power from the continuous combustion of liquid or gaseous fuel.

In my Patent No. 2,601,758, granted July 1, 1952, there is disclosed a gas turbine characterized by relatively high over-all efficiency compared to gas turbines of conventional design. A feature which contributes to high efficiency is the introduction of a combustible mixture of fuel and air in a plurality of localized circumferentially spaced combustion chambers through which the turbine blades pass. The fuel mixture burns within the combustion chambers and the resulting expanding gaseous products of combustion apply torque to the rotor. Air under pressure, as from a turbo compressor, is continuously supplied to the rotor in a direction to flow between blades in areas intervening between the combustion chambers, thereby scavenging the blades as they pass from one combustion chamber to the next, and cooling the blades to prevent over-heating. The gases discharging from the combustion chamber together with the scavenging and cooling air pass to a main turbine for further development of power.

In general it is an object of the present invention to improve in certain respects upon gas turbines of the type disclosed and claimed in my said Patent 2,601,758.

Another object of the invention is to provide a precombustion means for use with a gas turbine of the type disclosed in said patent, and which is particularly desirable for operation at relatively high rotative speeds.

Another object of the invention is to improve upon the turbine disclosed in said patent by providing means which has the effect of increasing the pressure of the combustion mixture in the combustion chamber.

Another object of the invention is to provide an improved gas turbine of the above type having means for effectively increasing the speed of flame propagation in the combustion chambers.

Another object of the invention is to provide a turbine of the above character having improved means for introducing a fuel into the air stream.

Another object of the invention is to provide improved means for extracting a greater percentage of energy from the gaseous products of combustion leaving the combustion chambers.

Another object of the invention is to provide an improved arrangement in a gas turbine for reversing the direction of flow of gases for impingement upon a second row of blades, before the gases are mixed with the scavenging and cooling air and before the mixture enters the blades of the main turbine.

Another object of the invention is to provide improved means for directing the flow of cooling air into contact with certain parts and for delivery of such air through the turbine blades between the combustion chambers.

Another object of the invention is to provide improved means for controlling the cooling air, particularly with respect to the amount of air permitted to flow between the turbine blades as they pass from one combustion chamber to the next.

Additional objects and features of the invention will appear from the following description in which the preferred embodiments of the invention have been set forth in detail in conjunction with the accompanying drawing.

Referring to the drawing:

Figure 1 is a side elevational view in section illustrating a prime mover incorporating the present invention.

Figure 2 is a cross-sectional view taken along the line 2—2 of Figure 1.

Figure 4 is a side elevational view like Figure 1 but showing another modification.

Figure 5 is a cross-sectional view taken along the line 5—5 of Figure 4.

Figure 3:
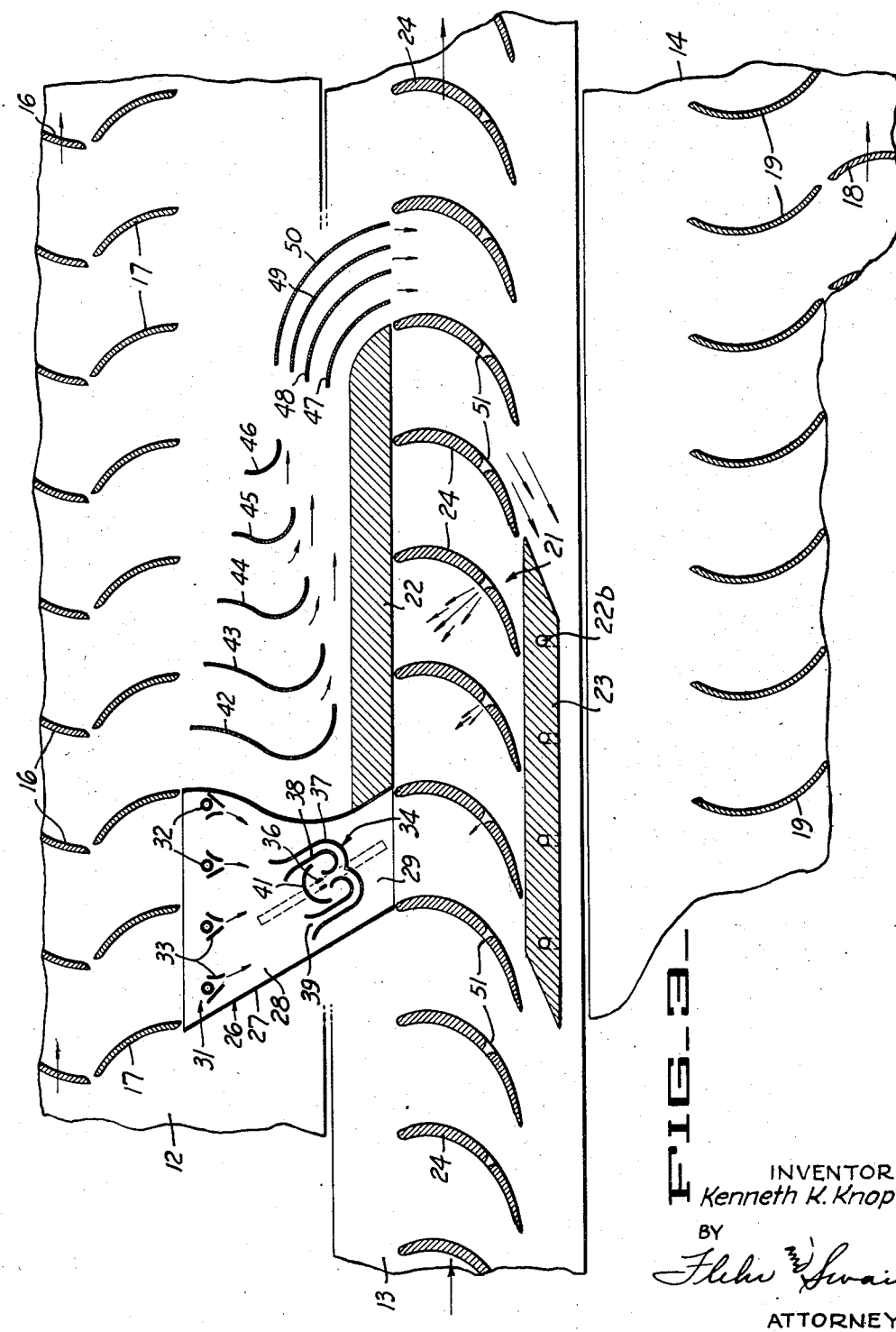
Figure 3 is a development in section along the plane 3—3 in Figure 1 illustrating the combustion chambers and the parts associated with the same.

In Figure 1, I have shown a gas turbine which in some respects is similar to the turbine disclosed in said Patent 2,601,758. This turbine as schematically illustrated, consists of a shaft 10 provided with suitable bearing supports (not shown) and mounted axially within the housing 11. Mounted upon the shaft are the rotors 12, 13 and 14. Rotor 12 forms a part of a suitable compressor unit, and it is provided with conventional vanes 16 cooperating with the stationary vanes 17. Rotor 14 forms a part of the turbine unit for the generation of power, and is provided with conventional blades 18 cooperating with the stationary blades 19. Rotor 13 is mounted between the rotors 12 and 14, and forms a part of the means for extracting mechanical work, as will be presently explained.

As disclosed in said Patent 2,601,758, a plurality of combustion chambers are formed in spaced regions about the periphery of the rotor 13, and the blades of this rotor successively pass through the combustion chambers. Fuel is burned directly within each combustion chamber. A feature of the present invention is that I provide means to initiate burning of the fuel with air in advance of the blades of the rotor 13, and this burning mixture is continuously delivered to the combustion chambers, where burning continues with continued generation of gaseous products of combustion. The means employed for this purpose can best be understood by referring to the schematic development of Figure 3. In this figure, one of the circumferentially spaced combustion chambers is designated generally at 21, and is defined by the stationary barriers 22 and 23. These barriers are carried by the housing in proximity with the sides of the turbine blades 24, which blades are attached to and form a part of the rotor 13.

Interposed between the turbine compressor 12 and the rotor blades 24, I provide a plurality of circumferentially spaced mixing and precombustion devices 26. Each device 26 includes the shell 27, which as viewed in development, provides a convergent passageway 28 which receives air delivered by the compressor 12, and delivers this burning fuel-air mixture through its discharge passage 29 into the spaces between the turbine blades 24. Preferably the region for delivery of gas from each device 26, is in advance of a stationary barrier 22, and over a circumferential distance corresponding generally to the circumferential spacing between the turbine blades.

At the entrant end of the shell 27 I provide fuel introduction means 31. This can consist of a plurality of atomizing fuel introduction nozzles 32, by means of which atomized liquid or gaseous fuel can be introduced, together with convergent air scoops 33, into which the atomized fuel is introduced, and which aid in securing intermixture between the fuel and the air stream. Intermediate the nozzles 32 and the turbine blades 24 I provide fuel ignition means 34. This means can consist of a suitable ignition device 36, as for example, an electrical spark gap, in conjunction with a flow directing means for directing combustible mixture across the ignitor. The flow directing means in this instance consists of the outer and inner parts 37 and 38, which form a fuel-air mixture scoop passage 39. The passage is so formed as to direct the flow in a backward direction across the spark gap, after which the flow is again directed toward the turbine blades 24, by the baffle 41. The entire fuel-air mixture directing and igniting device 34 is preferably mounted within the shell 27 by suitable means (not shown).

It is desirable to provide means between the devices 26 which serve to direct cooling air into contact with the stationary barriers 22, and in between the turbine blades 24, as these blades pass from one combustion chamber to the next. The means illustrated for this purpose can consist of the flow directing vanes 42 to 46 inclusive which are disposed to direct air from the turbo compressor, and in good heat exchange relation with the adjacent face of the metal barrier 22. Additional directing vanes 47, 48, 49 and 50 are shown for directing air flow past the turbine blades as they leave the proximity of the barrier 22.

Barriers 23 are shown (Figures 1 and 3) provided with ducts 22a, 22b for conveying cooling air from the compressor side of the barriers 22, through barriers 22, and then radially through barriers 23.

Operation of the turbine described above is as follows: Assuming that the shaft 10 is in rotation, atmospheric air is drawn in and compressed to a suitable pressure such as of the order of from 50 to 120 p. s. i., and is delivered into the passages 28, and particularly into the spaces between the devices 26. Fuel is continuously sprayed into the air flowing through each passage 28, to thereby form a combustible mixture, and this mixture is ignited in advance of delivery of the mixture into the spaces between the turbine blades. As the burning combustion mixture and the gaseous products of combustion flow into the spaces between the turbine blades 24, combustion continues with increased temperature and continued evolution of gaseous products of combustion. While in the combustion chambers or zones the burning gases are confined between the barriers 22 and 23, thus causing development of considerable pressure. As the the blades enter the next combustion chamber the spaces released with a resultant velocity component substantially as indicated by the arrows in Figure 3, and with development of a substantial thrust upon the blades. As the blades clear each barrier 22 they are immediately swept by cooling air to prevent attainment of excessive temperatures, and to scavenge gaseous products of combustion from the spaces between the blades. Thus as the blades enter the next combustion chamber the spaces between the blades are relatively free of gaseous products of combustion, and they have been cooled by the air flow. The flow of combustion gases from the turbine blades is directed to the main turbine 14 for extraction of power. Development of power by the blading on the rotor 13 causes a reduction of temperature of the gaseous products of combustion, and therefore such gases, diluted with the cooling air, are delivered at a safe temperature to the main turbine.

Precombustion as described above has certain inherent advantages. It avoids difficulties in introducing a fuel directly into the spaces between the blades with simultaneous ignition. In accordance with the present improvement the fuel is introduced into the air stream while in advance of introducing the mixture into the spaces between the blades, and ignition also takes place at a point in advance of the blades. Thus conditions are more favorable to effective intermixture of fuel with air, and for effective propagation of flame to secure better over-all efficiency. In addition such an arrangement is better suited to operation at relatively high rotative speeds. Mixing and ignition unit 34 can be located relative to the turbine blades for optimum operation.

It will be evident that the stationary barriers 23 in conjunction with barriers 22 make possible the attainment of higher pressures in the combustion chamber. As the turbine blades enter the regions of these barriers, the barriers function as valves to cut off and totally enclose the spaces between the blades. Proper circumferential positioning of the forward edges of these barriers, one in relation to the other, gives the effect of immediately blocking off the gas flow stream, and this of itself causes compression of gases between the blades. Likewise the outer end edges of the barriers function as valves to control the exhausting of gaseous products of combustion and to valve in the cooling air.

As an additional feature and to provide means tending to increase the speed of flame propagation in the spaces between the blades and between the barriers 22 and 23, I provide each blade with one or more orifices 51, which may be venturi shaped as illustrated, and which provide flow-restricting communication between the spaces on opposite sides of each blade. Within each combustion chamber the discharge jetting through each of the orifices 51 will be in the direction indicated, and such jetting causes turbulence to promote propagation of flame, and likewise effects some equalization of pressure. It will be evident that burning gases jetting through the orifices 51 serve to ignite the fuel-air mixture and propagate combustion.

Nozzles 32, in conjunction with the air scoop devices 33 serve to homogeneously spread atomized fuel throughout the entering air stream, thus providing an optimum homogeneous combustion mixture. Fair intermixture occurs before ignition and before the gases enter the enclosed spaces between the blades.

In general it may be explained that the burning gas is supplied to the combustion chambers or zones at substantially constant pressure and that a substantially constant volume is maintained between the blades until discharged therefrom.

Figure 6:
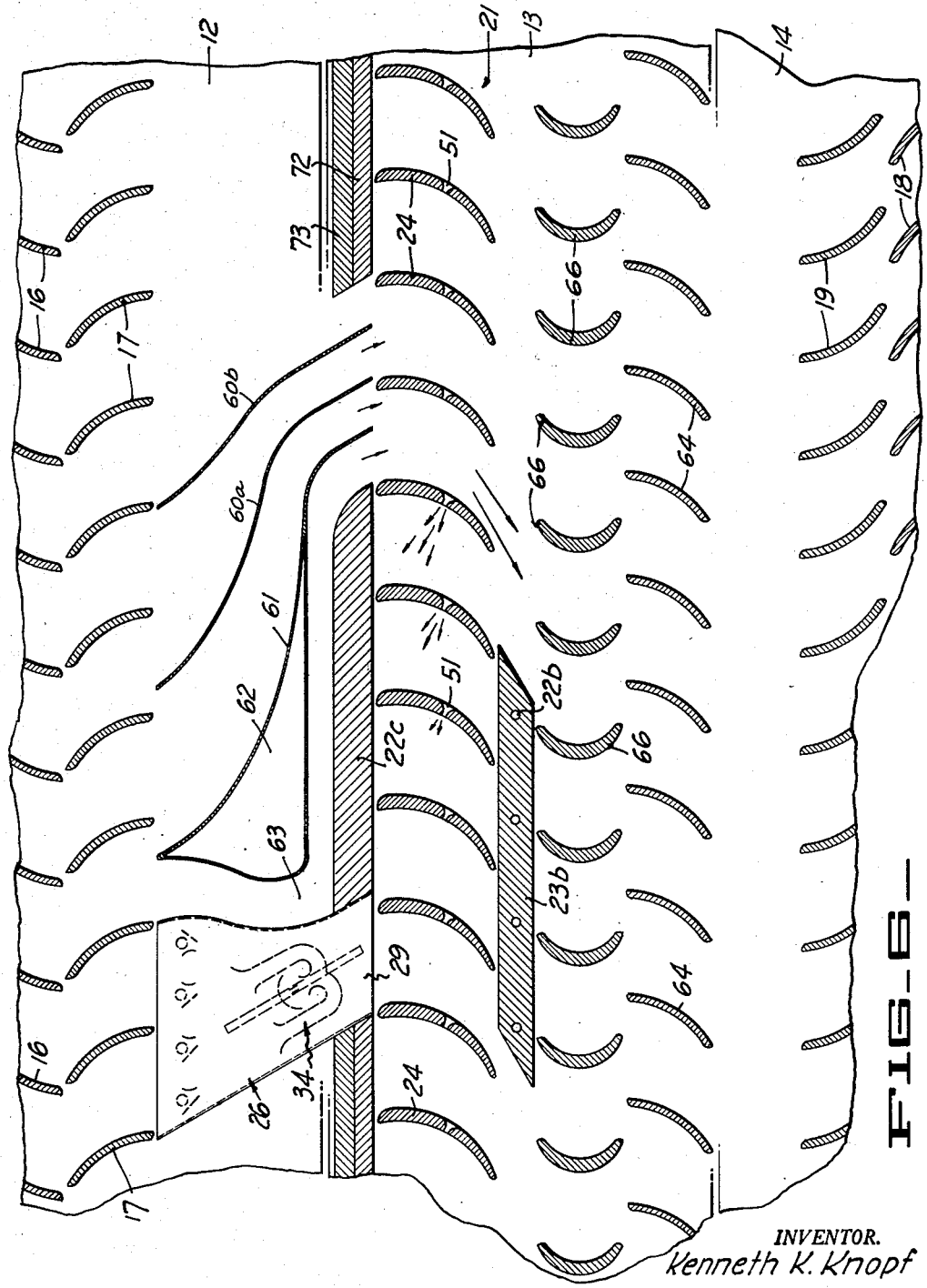
Figure 6 is a development view along the plane 6—6 in Figure 4 showing a combustion chamber and parts associated with the same for the embodiment of Figure 4.

Figures 4, 5 and 6 schematically illustrate another embodiment of the invention in which certain additional features have been incorporated. Instead of using the flow directing vanes 42 to 50 I employ a plurality of vane structures 61, which are made hollow to provide an inner dead air space 62. Each of these structures is contoured to provide a passage 63 for cooling air, which causes cooling air to sweep across each of the stationary barriers 22c. Adjacent each vane structure 61 I provide additional vanes 60a and 60b for directing cooling air toward the blades 24. Interposed between the second set of blades 64 of the rotor 13, and the stationary barriers 23b, I provide a set of reversing blades 66. These reversing blades are carried by a supplemental rotor 67, which is suitably journaled on its outer periphery by rollers 67a, and which is connected to suitable means for effecting its rotation in either direction, such as gear 68, driven by an electric motor or other suitable means (not shown).

During operation the turbine blades 66 may be rotated in either direction, whereby the blades are moved through successive cooling zones, to avoid attainment of excessive operating temperatures. It will be evident that if the blades 66 were permitted to be stationary during operation of the turbine, certain of these blades would be subjected to the relatively high temperature gas discharging from the combustion chambers. Continued contact with such gases, under certain conditions of operation, might cause the blades to be heated to excessively high temperatures. However, by continuous rotation of these blades, they are progressed through the high temperature zones and through intermediate cooling zones where they are cooled by contact with relatively cool air. The speed of rotation of the rotor carrying the blades 66 may, for example, be within a range such as from 10 to 300 R. P. M., and in either direction. Instead of providing independent means for rotating the blade 66, they can be connected to suitable reduction gearing which in turn is driven from the main turbine shaft.

Figure 5 also shows an arrangement which can be used for throttling the compressor when it is desired to reduce the power output of the complete unit. Thus circumferentially interposed between the stationary barriers 22c, I provide the flow control devices 71. Each of these devices forms in effect a valve of the shutter type, and consists of the members 72 and 73 which have cooperating slots 72a and 73a, member 73 being movable by suitable means such as the members 74. By adjustment of the control means 71, the amount of cooling air permitted to pass between the blades 24 can be adjusted, thus throttling the compressor, and minimizing the amount of air which is discharged through the blades 24 to intermingle with the gaseous products of combustion. Such adjustments can be used in conjunction with cutting out fuel to one or more sets of fuel nozzles, as previously described.

I claim:

1. In a prime mover, a turbine rotor provided with circumferentially spaced blades, said blades being curved and spaced to provide unobstructed flow passages between the same, a housing surrounding the rotor, means defining together with said blades localized circumferentially spaced combustion zones within the housing, means for supplying air under pressure to the rotor and in a direction to flow between the blades in the areas intervening between the combustion zones, means for supplying burning fuel to the combustion zones whereby said fuel burns between the blades with rapid expansion as the blades progress through combustion zones, the circumferential extent of said combustion zones being such that a plurality of successive spaces between blades is within a zone at any one instant, each of said blades being provided with a restricted orifice therethrough to permit flow from one closed space to the next.

2. In a prime mover a turbine rotor provided with circumferentially spaced blades, said blades being curved and spaced to provide unobstructed flow passages between the same, a housing surrounding the rotor, means stationary with respect to the rotor blades defining with said blades a plurality of circumferentially spaced combustion chambers within the housing, means for forming a combustible mixture of fuel and air, means for introducing said combustible mixture into said combustion chambers, a compressor unit adapted to supply air under pressure to said rotor, the flow of compressed air being through the areas between the stationary means and between the blades of the rotor passing from one combustion chamber to the next whereby combustion supporting air is supplied to the combustion chambers and whereby remaining products of combustion from a preceding combustion chamber are scavenged from the spaces between the blades and the blades cooled, and flow directing means serving to cause a stream of cooling air to flow across said stationary means to cool the same.

3. In a prime mover a turbine rotor provided with circumferentially spaced blades, said blades being curved and spaced to provide unobstructed flow passages between the same, a housing surrounding the rotor, means serving to define with said blades a plurality of localized, circumferentially spaced combustion chambers within the housing, means for supplying air under pressure to the rotor and in a direction to flow between the blades in areas intervening between the combustion chambers, means for introducing a combustible mixture into said combustion chambers, and means for providing flow restricted communication between the spaces on opposite sides of each turbine blade, said last means comprising flow orifices extending through each turbine blade.

References Cited in the file of this patent

FOREIGN PATENTS

| 466,140 | France | Feb. 21, 1914 |
| 383,287 | Germany | Oct. 12, 1923 |
| 469,180 | Great Britain | July 20, 1937 |
| 30,757 | Sweden | May 6, 1911 |
| 78,090 | Sweden | Aug. 15, 1933 |

OTHER REFERENCES

Ser. No. 297,773, Gussalli (A. P. C.), published May 25, 1943.